Jan. 9, 1940.  G. L. MANDAVILLE  2,186,418
MECHANICAL STEREOSCOPIC TRAINING DEVICE
Filed May 1, 1936  3 Sheets-Sheet 1
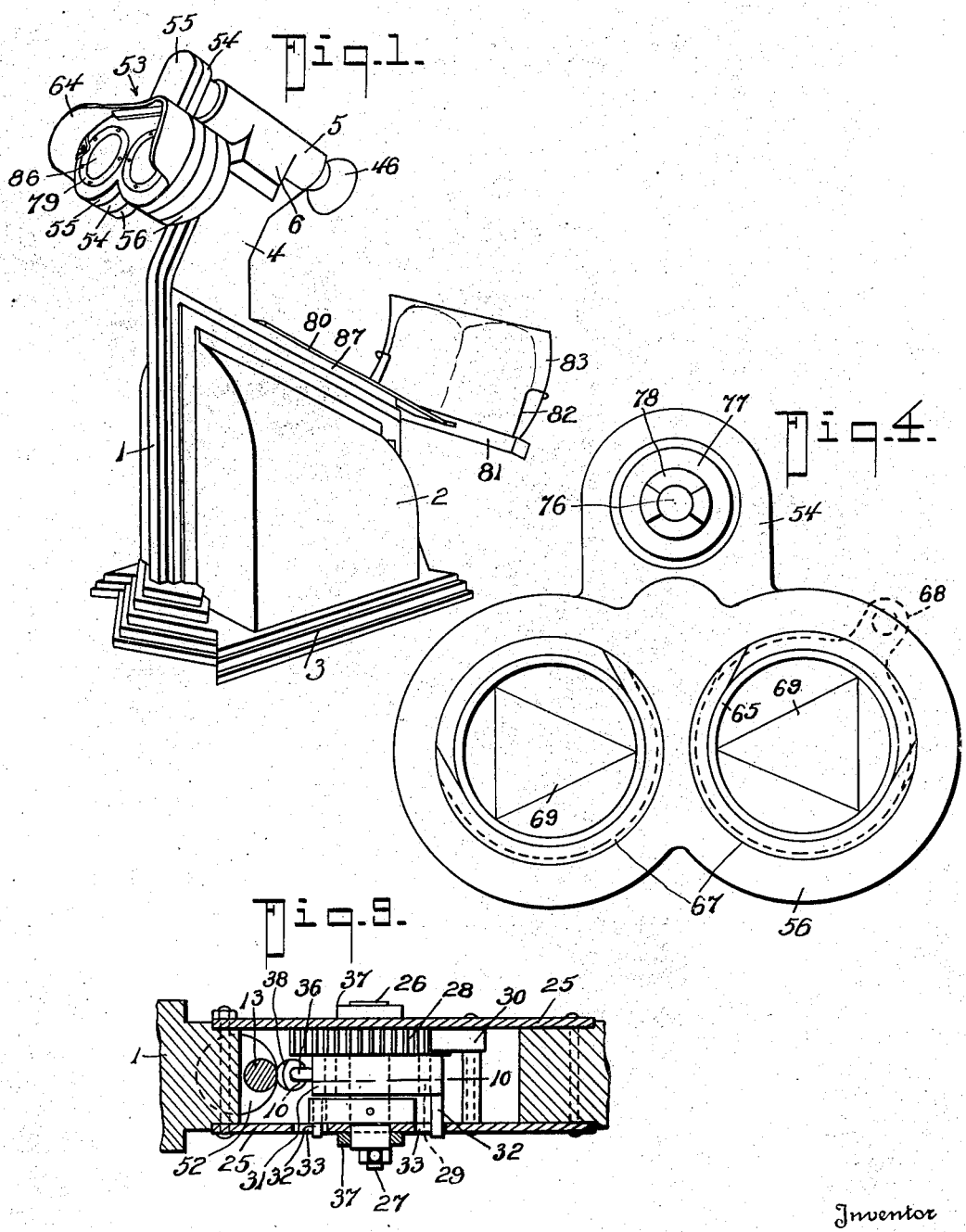
Inventor
G. L. Mandaville
By Albert E. Dieterich
Attorney Jan. 9, 1940.　　　G. L. MANDAVILLE　　　2,186,418
MECHANICAL STEREOSCOPIC TRAINING DEVICE
Filed May 1, 1936　　　3 Sheets-Sheet 2
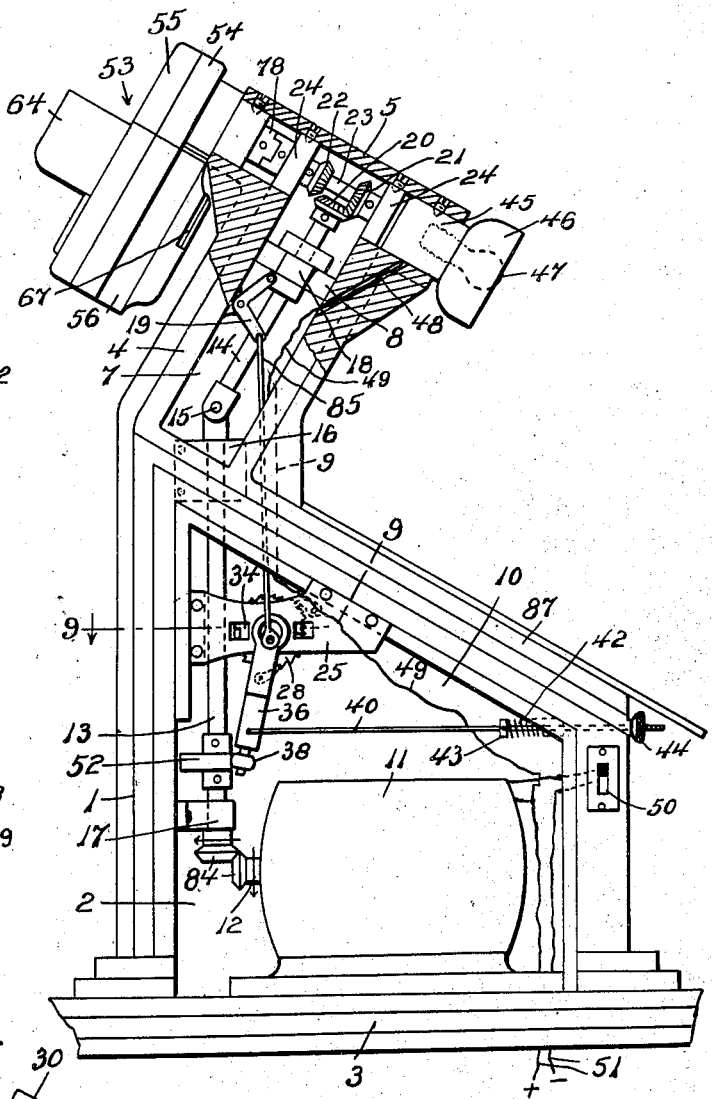
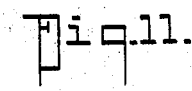
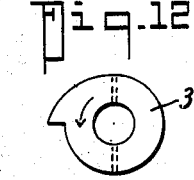
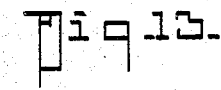
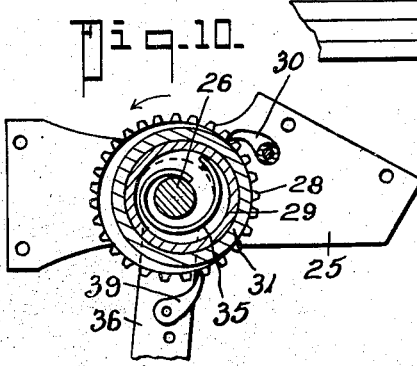
Inventor
G. L. Mandaville
By Albert E. Dieterich
Attorney

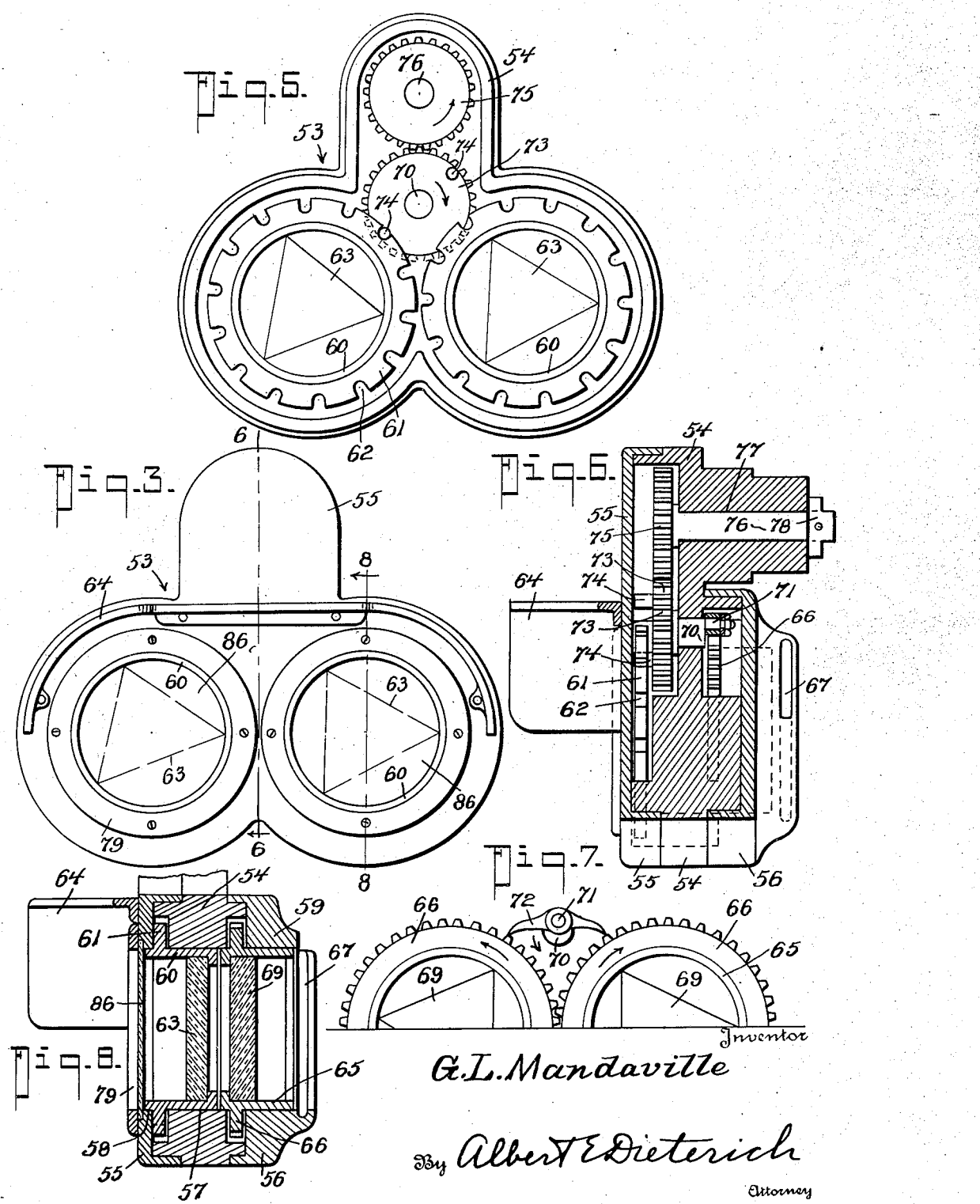

Patented Jan. 9, 1940

2,186,418

UNITED STATES PATENT OFFICE 2,186,418

MECHANICAL STEREOSCOPIC TRAINING DEVICE

Gurney L. Mandaville, Fort Pierce, Fla.

Application May 1, 1936, Serial No. 77,412

15 Claims. (Cl. 128—76.5)

My invention is an apparatus which has been designed for the purpose of equalizing and normalizing the action of the motor muscles of the human eye to synchronize or coordinate with the function known as accommodation (in optical terms it is an instrument to bring about coordination between accommodation and convergence).

Primarily, the invention has for its object to provide a simple, practical and inexpensive apparatus for the purpose stated in which the object is effectually accomplished by the use of prisms in revolving cylinders, two of which rotate in the same direction with the bases placed at approximately the same angle from the center, i. e., base down and base up, which cylinders are moved one at a time, giving a step motion, one in advance and the other is brought up to it with the second movement, together with a second set of two revolving cylinders which are directly geared together, causing them to rotate in opposite directions. These latter cylinders are fitted with prismatic lenses with their bases set so that as they rotate, base in and base out, prismatic action is caused.

A further object of the invention is to provide means to rotate the cylinders in their sockets or bearings by means of gears and a power transmitting drive from a motor, there being included means which makes it possible to rotate two of the cylinders in either direction, as desired, or to revolve the same a certain number of times in one direction and then, automatically reverse the direction of rotation and revolve them in opposite direction.

Further, it is an object to provide means whereby additional lenses or prisms can be added to the mechanical combination and by the use of ordinary stereoscopic photographs or fusion cards it is possible to bring a coordinating relationship between convergence and accommodation.

A further object is to provide an instrument for the purpose stated which can be used with a single picture or target or as a stereoscope with double pictures or targets.

Again, it is an object to provide an instrument of the character stated with a lamp for illuminating the pictures or targets and to provide for the adjustment of the target holder so that it may be set at a comfortable distance from eye to object.

Other objects will in part be obvious and in part generally pointed out hereinafter.

To the attainment of the aforesaid objects and ends, the invention still further resides in those novel details of construction, combination and arrangement of parts, all of which will be first fully described in the following detailed description, then be pointed out in the appended claims, reference being had to the accompanying drawings, in which:

Figure 1 is a perspective view of my invention.

Figure 2 is a part side elevation and part section of the same, one of the side covers being removed.

Figure 3 is a front elevation of the training instrument proper.

Figure 4 is a rear elevation of the same.

Figure 5 is a front elevation of the same, the front cover being removed.

Figure 6 is a vertical section on the line 6—6 of Figure 3.

Figure 7 is a detail elevation of portions of the rear ring gears and cylinders and the crank shaft and double pawl which rotates the said cylinders.

Figure 8 is a detail section on the line 8—8 of Figure 3.

Figure 9 is a detail section on an enlarged scale taken approximately on the line 9—9 of Figure 2.

Figure 10 is a detail section on the line 10—10 of Figure 9.

Figures 11, 12 and 13 are detail elevations of parts of the timer mechanism later referred to.

In the drawings, in which like numerals of reference indicate like parts in all of the figures, 1 is a suitable skeleton-like frame having a space between its legs and being suitably mounted on a base 3. Side covers or closures 2 associated with the frame 1 serve to enclose the motor and operating parts of the machine.

The frame 1 has a chambered neck 4, which neck is inclined to the horizontal, say preferably at an angle of 60°. The neck 4 carries a tubular head 5 whose axis lies in the central longitudinal plane of the frame and at an angle of approximately 30° to the horizontal. The chamber 7 of the neck adjacent the head is laterally enlarged by the bulges 6 (see Figure 1) in order to accommodate the sliding bearing 18 hereinafter again referred to.

Located in the neck 4 is a slotted guide 8 for the bearing 18 and a slot 9 in the frame 1 permits communication between the chamber 7 and the space or chamber 10 between the covers 2—2.

An electric motor 11 of any suitable kind is located in the chamber 10 and has its shaft 12 coupled to the articulated driving shaft 13—14 by bevel, or other suitable gears 84.

The shaft section 13 is journalled in suitable fixed bearings 16—17 and is connected to the shaft section 14 by a universal joint 15. The shaft section 14 is journalled in the shiftable bearing 18 hereinbefore mentioned and carries a bevel gear 20 which may be brought into mesh alternately with the gears 21—22 on the shaft 23. The shaft 23 is journalled in bearings 24 in the head 5 and carries one element of a separable coupling 78 hereinafter again referred to.

The shaft bearing 18 is shiftable to cause the gear 20 to mesh with either gear 21 or 22 through the medium of a bell crank 19 which in turn is actuated by a crank 27 on the shaft 26 of a timer 25, through a connecting rod 85.

The timer 25 is best shown in Figures 2 and 9 to 13, inclusive, by reference to which it will be observed that the timer includes a suitably mounted frame composed of said plates held in spaced relation and provided with bearing apertures for the crank shaft 26. Located between the plates and rotatably mounted on the shaft 26 is a gear or ratchet wheel 28 which has an eccentric collar 29 in which is located a spring 35, one end of which is connected to the collar and the other end to the shaft 26. Mounted on the collar 29 is a ring 31 having lugs 32 disposed at diametrically opposite points. These lugs move in radially disposed slots 33 in one of the side plates of the timer.

Pinned or otherwise secured to the shaft 26 is a stop cam 34 whose nose engages the lugs 32 as stops in a manner which will later more fully appear. (See Figures 2 and 9.)

Pivoted on the shaft 26 by the bearing ends 37 is a rocker arm 36 which carries a roller 38 that engages a cam 52 on the shaft section 13. A spring pressed pawl 39 carried by the arm 36 continuously engages the ratchet 28 (see Figure 10).

In order to hold the arm 36 in an inoperative or in an operative position, a rod 40 passes through a hole in the frame 1 and at its inner side it is connected to the arm 36 while its outer end is threaded to receive an adjusting nut 44. A spring 42 and a collar 43 continuously urge the rod 40 toward the lever 36, thereby to hold the roller 38 in contact with the cam 52 when the nut 44 is loosened.

A lamp base or reflector holder 45 is secured in the rear end of the head 5 and carries a reflector 46 and lamp 47. Current conducting wires 49 connect the lamp with a switch 50 and lead-in wires 51 to conduct the current from an external source (not shown) to the motor 11 and switch 50 in any approved way.

A channel 48 may be drilled in the neck 4 to pass the wires from the socket 45 into the chamber 7 from whence they may pass down through the slot 9 into the chamber 2, etc.

The training instrument proper 53 which comprises an important part of the invention is best illustrated in Figures 1 to 8 inclusive by reference to which it will be seen that a suitable case is provided which may consist of a base 54, a front cover 55 and a back cover 56. The covers and base are held in assembled relation by friction or in any other suitable way.

The base 54 has suitable bearings 57 for the front ring gear cylinders 60 and the front gear case 55 has openings 58 for the same.

The rear cover 56 has bearings 59 for the rear ring gear cylinders 65 (see Figure 8).

The front ring gears 61 have the spaces 62 between adjacent teeth formed to receive the pins 74 on the rotating gear 73. The gear 73 is mounted on and turns the crank shaft 70 whose crank 71 carries the double pawl 72 which operates the rear ring gears 66.

The front cylinder 60 carries prisms 63 which are arranged in the same relative positions in their respective cylinders, and the cylinders 60 are turned by the pins 74 one at a time giving a step motion to the cylinders one in advance of the other, the other being brought up to the first cylinder with the second movement.

The rear cylinders 65 have prisms 69 and are directly geared together (see Figure 7) so as to rotate in opposite directions (the front cylinders 60 are rotated in the same direction). The bases of the prisms 69 are set relatively opposed, i. e., the bases are adjacent when the parts are positioned as in Figure 7 or the apexes are adjacent when the parts are moved to the position shown in Figure 4.

The front of the instrument 53 is provided with a hood or vizor 64 while the cover 56 has a rear extension that is provided with grooved holders 67 for auxiliary lenses or prisms 68 (see dotted lines Figure 4) if desired.

Power is transmitted from the shaft 23 to the shaft 70 by means of a stub shaft 76 and a coupling member 78 through a gear 75, the shaft 76 being journaled in a bearing 77 of base 54 of the case. The bearing 77 is secured, in any suitable way, in the front end of the tubular head 5 (see Figure 1).

Glasses 86 may be held over the openings 58 by ring plates 79, if desired.

The target 83 is carried by the wire brackets 82 on the cross bar 81 that is slidably adjustably held on the slideway or bar 80 which is attached to the inclined part 87 of the frame 1.

Operation

Assume the nut 44 has been slacked off sufficiently to enable the roller 38 to engage the lowest part of the cam 52, upon closing the circuit at switch 50 the motor 11 will be set to run and light 47 will be energized. With the parts positioned as shown in Figure 2, if the motor is running in the direction of the arrow on its shaft 11 in Figure 2, the gears 20 and 21 being in mesh, the shaft 23 will be turned in the direction of the arrow on gear 75 in Figure 5 which in turn turns the shaft 70 in a clockwise direction in Figure 5 (counterclockwise in Figure 7) thereby imparting a step-by-step movement to the gears 61 alternately in the direction of the arrow in Figure 5. At the same time the pawl 72 imparts a step-by-step movement to the gears 66 in the direction of the arrows in Figure 7.

As the shaft 13 rotates, cam 52 will rock lever 36 which, for each rotation of the cam 52, advances the ratchet 28 a predetermined distance. As the ratchet 28 is advanced, the spring 35 is wound up and, twice in each revolution of the ratchet 28, the eccentric collar 31 causes the lug 32, against which the nose of the cam 34 is resting, to be moved out of the way and thus permits spring 35 to function, thereby rotating the shaft 26 one-half turn and causing crank 27 to actuate the lever 19, through rod 85, and shaft gear 20 over from one gear 21 to the other gear 22 (or vice versa, as the case may be) and thus reverse the rotation of the shaft 23 and the parts of the instrument proper 53 operated from such shaft.

When it is desired to rotate the prisms continuously, i. e. without reverse action, the nut 44 is tightened sufficiently to hold the roller 38 out of the path of the cam 52.

It has been found that a greater stimulation to the nerve innervation and a more rapid building up of coordination between accommodation and convergence of the human eyes is obtained by an intermittent or jump motion and for this reason my invention provides for the two distinct movements aforesaid that cause the desired prismatic action. When in the claims I refer to "a training instrument proper" I desire that that term be taken to refer to the instrument shown in Figures 3 to 8, inclusive, or the equivalent thereof.

From the foregoing description, taken in connection with the accompanying drawings, it is thought that the complete construction, operation and advantages of my invention will be readily understood by those skilled in the art.

I claim:

1. In an instrument of the character described, a pair of front prism-carrying cylinders, and a pair of rear prism-carrying cylinders, the front cylinders being in alignment with the rear ones, cooperatively arranged prisms in the several cylinders, means for imparting an intermittent rotation to the front cylinders in the same direction, and means to impart rotation to the rear cylinders in opposite directions in unison.

2. In an instrument of the character described, a pair of front prism-carrying cylinders, and a pair of rear prism-carrying cylinders, the front cylinders being in alignment with the rear ones, cooperatively arranged prisms in the several cylinders, means for imparting an intermittent rotation to the front cylinders in the same direction, one in advance of the other, and means to impart rotation to the rear cylinders in opposite directions in unison.

3. In an instrument of the character described, a pair of front prism-carrying cylinders and a pair of rear prism-carrying cylinders, the front cylinders being in alignment with the rear ones, cooperatively arranged prisms in the several cylinders, means for imparting an intermittent rotation to the front cylinders in the same direction, and means to impart an intermittent rotation to the rear cylinders in opposite directions in unison.

4. In an instrument of the character described, a pair of front prism-carrying cylinders and a pair of rear prism-carrying cylinders, the front cylinders being in alignment with the rear ones, cooperatively arranged prisms in the several cylinders, means for imparting an intermittent rotation to the front cylinders in the same direction, one in advance of the other, and means to impart an intermittent rotation to the rear cylinders in opposite directions in unison.

5. In apparatus of the class described, a case, a pair of front cylinders rotatably mounted in the case, a pair of rear cylinders rotatably mounted in the case in alignment with the pair of front cylinders, prisms carried by the front cylinders and arranged with their apexes pointing in approximately the same direction, prisms carried by the rear cylinders with their bases set opposite one another, and means to rotate said front cylinders in the same direction at different times and to rotate the rear cylinders in opposite directions.

6. In apparatus of the class described, a case, a pair of front cylinders rotatably mounted in the case, a pair of rear cylinders rotatably mounted in the case in alignment with the pair of front cylinders, prisms carried by the front cylinders and arranged with their apexes pointing in approximately the same direction, prisms carried by the rear cylinders with their bases set opposite one another, means to rotate said front cylinders in the same direction at different times and to rotate the rear cylinders in opposite directions, and means to reverse the direction of rotation of the front cylinders without effecting the rotation of the rear cylinders.

7. In an instrument of the character stated, a case, two sets of prisms in revolving cylinders mounted within the case one set behind the other, means to rotate one set of said cylinders in the same direction with the prisms placed therein in approximately the same positions, means to rotate the other set of cylinders in unison in opposite directions, the prisms in said other set of cylinders being so set therein that their bases will be opposed to one another as said other cylinders rotate, for purposes described.

8. In an instrument of the character stated, a case, a front pair and a rear pair of prisms in revolving cylinders mounted within the case, means to rotate the front pair of said cylinders, one at a time, step-by-step, and one in advance of the other, in the same direction, the prisms of the front pair being located in like positions in their respective cylinders, means to rotate the rear pair of cylinders in unison in opposite directions, the prisms in said rear pair of cylinders being located in opposed positions within their respective cylinders, substantially as specified.

9. In apparatus of the class described, a supporting frame, a training instrument proper mounted on the frame and including a stub shaft, a target mounted on the frame in a position so as to be viewed through the training instrument proper, a motor, power transmitting connections between said motor and said stub shaft for operating the instrument, and means to shift said connections at timed intervals to reverse the direction of rotation of said stub shaft for the purposes described.

10. In apparatus of the class described, a supporting frame, a training instrument proper mounted on the frame and including a stub shaft, a target mounted on the frame in a position so as to be viewed through the training instrument proper, a motor, power transmitting connections between said motor and said stub shaft for operating the instrument, means to shift said connections at timed intervals to reverse the direction of rotation of said stub shaft, said last named means including a shiftable gear and a jump action timer for effecting a quick shifting of said gear at stated intervals.

11. In apparatus of the class described, a supporting frame, a training instrument proper mounted on the frame and including a stub shaft, a target mounted on the frame in a position so as to be viewed through the training instrument proper, a motor, power transmitting connections between said motor and said stub shaft for operating the instrument, means to shift said connections at timed intervals to reverse the direction of rotation of said stub shaft, said training instrument also including a case, prisms in revolving cylinders mounted in the case, means to rotate a pair of said cylinders, one at a time, step-by-step, and one in advance of the other in the same direction with the bases of the prisms disposed therein in approximately the same relative positions, means to rotate the other pair of cylinders in unison in opposite directions, the prisms in said other pair of cylinders being opposed to one another, the first pair of prisms being located in front of the other pair, substantially as specified.

12. In apparatus of the class described, a supporting frame, a training instrument proper mounted on the frame and including a stub shaft, a target mounted on the frame in a position so as to be viewed through the training instrument proper, a motor, power transmitting connections between said motor and said stub shaft for operating the instrument, means to shift said connections at timed intervals to reverse the direction of rotation of said stub shaft, said last named means including a shiftable gear and a jump action timer for effecting a quick shifting of said gear at stated intervals, said training instrument also including a case, prisms in revolving cylinders mounted in the case, means to rotate a pair of said cylinders, one at a time, step-by-step, and one in advance of the other in the same direction with the prisms disposed therein in approximately the same relative positions, means to rotate the other pair of cylinders in unison in opposite directions, the prisms in said other pair of cylinders being relatively opposed to one another, the first pair of prisms being located in front of the other pair, substantially as described.

13. In apparatus of the class described, a supporting frame, a training instrument proper mounted on the frame and including a stub shaft, a target mounted on the frame in a position so as to be viewed through the training instrument proper, a motor, power transmitting connections between said motor and said stub shaft for operating the instrument, means to shift said connections at timed intervals to reverse the direction of rotation of said stub shaft, said last named means including a shiftable gear and a jump action timer for effecting a quick shifting of said gear at stated intervals, and means to render said timer inactive at will.

14. In apparatus of the class described, a supporting frame, a training instrument proper mounted on the frame and including a stub shaft, a target mounted on the frame in a position so as to be viewed through the training instrument proper, a motor, power transmitting connections between said motor and said stub shaft for operating the instrument, means to shift said connections at timed intervals to reverse the direction of rotation of said stub shaft, said last named means including a shiftable gear and a jump action timer for effecting a quick shifting of said gear at stated intervals, said training instrument also including a case, prisms in revolving cylinders mounted in the case, means to rotate a pair of said cylinders, one at a time, step-by-step, and one in advance of the other in the same direction with the prisms disposed therein in approximately the same relative positions, means to rotate the other pair of cylinders in unison in opposite directions, the prisms in said other cylinders being set relatively opposite to one another, the first pair of prisms being located in front of the other pair, and means to render said timer inactive at will.

15. In an instrument of the character stated, a case, prisms in revolving cylinders mounted within the case, means to rotate a pair of said cylinders, one at a time, step-by-step, and one in advance of the other, in the same direction with the prisms placed therein in approximately the same relative positions, means to rotate two other cylinders in unison in opposite directions, the prisms in said other pair of cylinders being set relatively opposite to one another, the first pair of prisms being located in front of the other pair, and auxiliary lens holders on the rear of the case to receive auxiliary lenses to cooperate with the rotating prisms.

GURNEY L. MANDAVILLE.